May 24, 1932.  C. R. VAN ARSDALL  1,860,002
LAWN MOWER REEL
Filed Dec. 17, 1930
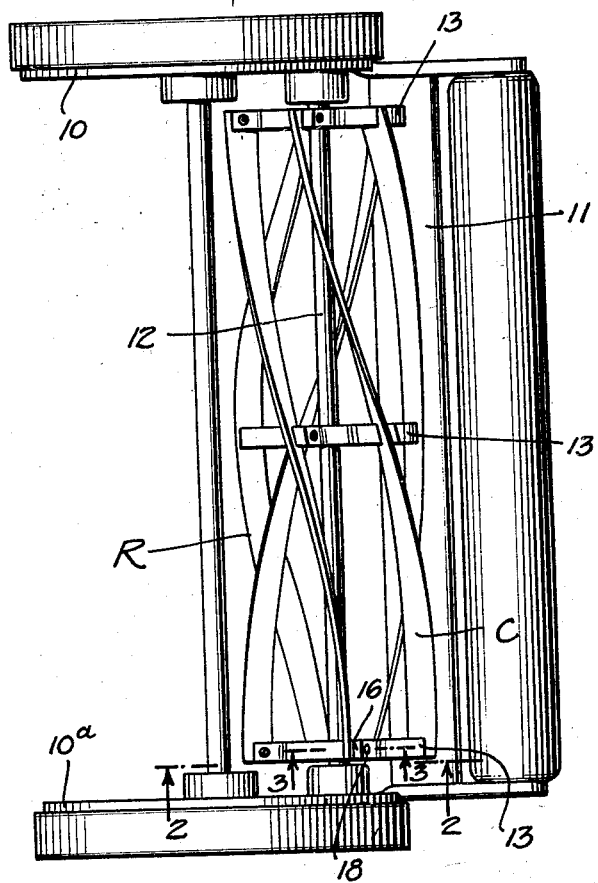
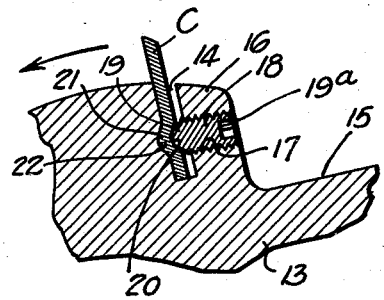
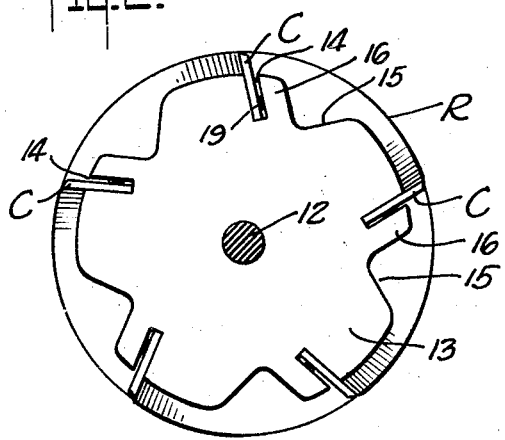
INVENTOR.
CHARLES R. VAN ARSDALL
BY
ATTORNEYS.

Patented May 24, 1932

1,860,002

UNITED STATES PATENT OFFICE

CHARLES R. VAN ARSDALL, OF PACIFIC PALISADES, CALIFORNIA

LAWN MOWER REEL

Application filed December 17, 1930. Serial No. 503,071.

My invention relates generally to lawn mower reels of the character embodying a plurality of circumferentially spaced cutting blades which during operation of the mower over a lawn co-act with a stationary cutting blade to effect cutting of the grass.

It is the purpose of my invention to provide a reel for lawn mowers, the blades of which are detachably secured thereto in a manner to enable the blades to be applied to and removed from the reel with the utmost ease and dispatch so that blades which have become dull, unevenly worn, or otherwise rendered unfit for efficient use can be readily replaced with new blades without removing the reel from the mower or otherwise disassembling the latter, to the end of effecting a large saving of time and labor, as well as the increased expense of grinding the old blades over that incident to replacing the old blades with new blades.

I will describe only one form of lawn mower reel embodying my invention, and will then point out the novel features thereof in claims.

In the accompanying drawings:

Figure 1 is a view showing in plan a lawn mower with the reel embodying my invention associated therewith.

Figure 2 is a vertical sectional view taken on the line 2—2 of Figure 1, and

Figure 3 is an enlarged fragmentary sectional view taken on the line 3—3 of Figure 1.

Referring specifically to the drawings in which similar reference characters designate similar parts in each of the several views, my invention in its present embodiment is shown associated with a conventional lawn mower having side frames 10 and 10ª spanned by a stationary cutting blade 11, and having journaled therein the axle 12 of a reel R provided with several circumferentially spaced and spirally extending cutting blades C, it being understood that the reel is positively rotated by conventional mechanism (not shown) during forward movement of the mower over a lawn so that its cutting blades C will co-act with the stationary blade 11 in cutting the grass of the lawn.

The cutting blades C are supported from the axle 12 by means of metallic heads 13 of substantially disk form axially receiving and fixed to the axle in any suitable manner at intervals along its length, and depending in number on the length of the blades. As the manner in which the blades are detachably secured to each head is identical, a detailed description of one head with the means for securing one blade thereto will suffice for all.

Each head is provided at equally spaced intervals circumferentially with blade receiving recesses or slots 14 corresponding in number to the number of blades and extending tangentially with respect to the axis of the head. Each recess 14 co-acts with a notch 15 formed in the periphery of the head adjacent the recess, to provide a lug 16 having a threaded bore 17 therethrough, receiving a set screw 18 of the safety or headless type, the inner end of which is conical or rounded as indicated at 19 and the outer end provided with a wrench receiving socket 19ª of angular form.

When the set screw 18 is tightened, its inner end 19 bears against a side face of the cutting blade C when seated in the recess 14, and enters a depression 20 in the blade corresponding in shape to that of the inner end of the set screw. In alinement with the depression 20, the opposite side face of the blade is provided with a protuberance or teat 21 which is received in a correspondingly shaped depression 22 formed in the head 13 in alinement with the axis of the bore 17, so as to co-act with the protuberance 21 when the set screw is tightened as shown in Figure 3, to fixedly secure the blade to the head.

The depression 20 and the protuberance 21 can be formed simultaneously by extruding the metal of the blade in a suitable press, and it will be understood that the thickness of the blade combined with the amount that the protuberance projects beyond the side of the blade, is less than the width of the recess 14 so that when the set screw 18 is loosened sufficiently to clear its inner end 19 from the recess 14, the blade can be readily inserted into or removed from the recess.

It will be manifest that with each blade secured to each head by a set screw 14 and the co-acting depressions and protuberance, that the blades will be securely held in fixed positions on the reel, yet can be readily removed upon loosening the set screws, so as to permit the substitution of new blades with the utmost ease and dispatch.

Furthermore, the securing means for the blades permits of a limited lateral flexing of the blades in the recesses 14 should some substance incapable of being severed, become jammed between any of the cutting blades C and the stationary blade 11 during cutting movement of the reel in the direction of the arrow in Figure 3, thus preventing fracturing and possible breaking of the blades.

Although I have herein shown and described only one form of lawn mower reel embodying my invention, it is to be understood that various changes and modifications may be made therein without departing from the spirit of the invention and the spirit and scope of the appended claims.

I claim:

1. A lawn mower reel comprising an axle having heads fixed thereto at intervals along its length, the peripheries of the heads having recesses circumferentially spaced at intervals, blades spanning the heads and entering the recesses, the heads having threaded bores opening to one wall of the recesses and having depressions disposed in the opposite wall of the recesses, the blades having protuberances received in the depressions and having depressions confronting the bores, and screws threaded into the bores and seating in the depressions of the blades for co-action with the protuberances and the depressions of the heads in fixedly securing the blades to the heads.

2. A lawn mower reel comprising an axle having heads fixed thereto at intervals along its length, the peripheries of the heads having recesses circumferentially spaced at intervals, and notches adjacent the recesses co-acting therewith to form lugs on the heads, the lugs having threaded bores opening to one wall of the recesses, cutting blades spanning the heads and entering the recesses, the heads having depressions disposed in the opposite wall of the recesses, the blades having protuberances received in the depressions and provided with depressions confronting the bores, and screws threaded into the bores and seating in the depressions of the blades for co-action with the protuberances and the depressions of the heads in fixedly securing the blades to the heads.

3. A lawn mower reel comprising an axle having heads fixed thereto at intervals along its length, the peripheries of the heads having recesses circumferentially spaced at intervals, blades spanning the heads and entering the recesses, the heads having threaded bores opening to one wall of the recesses, screws threaded into the bores and bearing against the blades, and means on the heads and blades co-acting with the screws to fixedly secure the blades to the heads.

4. In combination, a support having a recess and a threaded bore opening to one wall of the recess, the support having a depression disposed in the opposite wall of the recess, a cutting blade extending into the recess and having a depression receiving the screw and a protuberance entering the depression of the support whereby to fixedly secure the blade to the support.

5. In combination, a support having a recess and a threaded bore opening to one wall of the recess, the support having a depression disposed in the opposite wall of the recess, in alinement with the axis of the bore, a cutting blade extending into the recess and being extended to provide a depression receiving the screw and a protuberance entering the depression of the support, whereby to fixedly secure the blade to the support.

6. In combination, a support having a recess therein, a blade extending into the recess, screw means in the support engaging the blade, and means on the support and blade co-acting with the screw means to fixedly secure the blade to the support, the last means comprising a protuberance and a co-acting depression, one of which the support is provided with and the other of which the blade is provided with.

CHARLES R. VAN ARSDALL.